United States Patent
Sefton

(10) Patent No.: US 7,224,326 B2
(45) Date of Patent: May 29, 2007

(54) VIRTUAL REALITY SYSTEM

(75) Inventor: Robert T. Sefton, Birmingham, MI (US)

(73) Assignee: Volo, LLC, Birmingham, MI (US)

( * ) Notice: Subject to any disclaimer, the term of this patent is extended or adjusted under 35 U.S.C. 154(b) by 576 days.

(21) Appl. No.: 10/792,593

(22) Filed: Mar. 3, 2004

(65) Prior Publication Data

US 2005/0195128 A1 Sep. 8, 2005

(51) Int. Cl.
*G09G 5/00* (2006.01)
(52) U.S. Cl. .............................................. 345/8; 345/9
(58) Field of Classification Search .................... 345/7, 345/8, 9, 427
See application file for complete search history.

(56) References Cited

U.S. PATENT DOCUMENTS

| | | | | |
|---|---|---|---|---|
| 4,566,763 A | 1/1986 | Greguss | ...................... | 359/725 |
| 5,130,794 A | 7/1992 | Ritchey | ....................... | 358/87 |
| 5,466,200 A | 11/1995 | Ulrich et al. | ................... | 482/4 |
| 5,499,146 A | 3/1996 | Donahue et al. | ........... | 360/33.1 |
| 5,562,572 A | 10/1996 | Carmein | ......................... | 482/4 |
| 5,577,981 A | 11/1996 | Jarvik | ........................... | 482/4 |
| 5,745,305 A | 4/1998 | Nalwa | ....................... | 359/725 |
| 5,785,630 A | 7/1998 | Bobick et al. | ................. | 482/4 |
| 5,890,995 A | 4/1999 | Bobick et al. | ................. | 482/4 |
| 5,960,108 A | 9/1999 | Xiong | ........................ | 382/154 |
| 6,050,822 A | 4/2000 | Faughn | ......................... | 434/11 |
| 6,244,987 B1 | 6/2001 | Ohsuga et al. | ................. | 482/4 |
| 6,327,381 B1 | 12/2001 | Rogina et al. | .............. | 382/154 |
| 6,429,867 B1 * | 8/2002 | Deering | ...................... | 345/423 |
| 6,486,908 B1 | 11/2002 | Chen et al. | .................... | 348/39 |
| 2001/0001303 A1 | 5/2001 | Ohsuga et al. | ................. | 482/5 |
| 2002/0055422 A1 | 5/2002 | Airmet et al. | ................ | 482/61 |
| 2003/0063089 A1 | 4/2003 | Chen et al. | ................. | 345/473 |
| 2003/0063816 A1 | 4/2003 | Chen et al. | ................. | 382/284 |
| 2004/0214690 A1 | 10/2004 | Couvillion, Jr. et al. | | |
| 2004/0260191 A1 | 12/2004 | Stubbs et al. | | |
| 2005/0148432 A1 | 7/2005 | Carmein | | |
| 2005/0233861 A1 | 10/2005 | Hickman et al. | | |
| 2006/0057549 A1 | 3/2006 | Prinzel, III et al. | | |

FOREIGN PATENT DOCUMENTS

| | | |
|---|---|---|
| JP | 2000206635 | 11/2000 |
| WO | 03046632 | 6/2003 |

OTHER PUBLICATIONS

PCT International Search Report, Written Opinion of International Searching Authority and Notes, International App. No. PCT/US05/04099, dated Jul. 18, 2006, 9 pp.

* cited by examiner

*Primary Examiner*—Richard Hjerpe
*Assistant Examiner*—Jean Lesperance
(74) *Attorney, Agent, or Firm*—Howard & Howard Attorneys, P.C.

(57) ABSTRACT

A virtual reality (VR) system includes an image playback system that sends images to an image viewing device, such as a pair of display glasses. Each image has a 360-degree field of view. An user views a portion of the images. The portion of the image viewed is determined by a directional sensor mounted to the display glasses. The images are advanced according to a speed sensor attached to a moving device, such as a stationary bicycle. The VR system simultaneously coordinates the portion of the images viewed by the user by coordinating signals from the directional sensor and the speed sensor.

20 Claims, 4 Drawing Sheets

VIRTUAL REALITY SYSTEM

BACKGROUND OF THE INVENTION

1. Field of the Invention

The subject invention relates generally to virtual reality (VR) systems. The invention relates specifically to VR systems coupled with an exercise apparatus where a user views and interacts with images in an immersion-type fashion.

2. Description of the Related Art

Various VR systems are well known in the prior arch in which a user views a plurality of images. Two such VR systems are disclosed in U.S. Pat. No. 5,499,146 (the '146 patent) to Donahe et al. and U.S. Pat. No. 6,244,987 (the '987 patent) to Ohsuga et al.

The '146 patent discloses a VR system having an image playback system for storing a plurality of images having a 360-degree field-of-view. The images are previously recorded using a plurality of video cameras and electronically "stitched" together to create the images with the 360-degree field-of-view. The playback system is operatively connected to a display and a directional sensor. The display and directional sensor are mounted to a helmet that is worn by a user. The display shows a portion of each image based on the position of the helmet, as measured by the directional sensor. The plurality of images are sequenced and displayed for the user at a predetermined rate.

The '987 patent discloses a VR system having an image playback system for storing a plurality of images. The playback system is operatively connected to a display and a speed sensor. The speed sensor is attached to an exercise apparatus for measuring a speed of a user operating the exercise apparatus. The display presents the plurality of images to the user at a rate determined by the speed measured by the speed apparatus.

Although these systems may provide some advantages over other systems, there remains an opportunity for a VR system that provides a more realistic environment of 360-degree images that are dynamically viewed by a user.

BRIEF SUMMARY OF THE INVENTION AND ADVANTAGES

The invention provides a virtual reality (VR) system comprising an image playback system having a storage device for maintaining a plurality of images. Each image has a field-of-view defining an X direction and a Y direction. An image viewing device operatively communicates with the playback system for displaying a portion of the plurality of images to a user. A directional sensor operatively communicates with the playback system for defining a viewing direction of the user in both of the X and Y directions. A forward and rearward moving device defines a Z direction. A speed sensor is operably connected to the moving device and operatively communicates with the playback system for providing a rate of change of the plurality of images in the Z direction. The VR system is characterized by the image playback system having a controller operatively connected to the storage device. The controller simultaneously coordinates the X and Y directions of the directional sensor and the Z direction of the speed sensor. The viewing direction and the rate of change are interlaced to automatically change the plurality of images displayed by the image viewing device in the X, Y, and Z directions when the user moves the directional sensor in at least one of the X and Y directions and simultaneously moves the moving device in the Z direction.

The invention also includes a method of operating the VR system. The method includes the steps of maintaining the plurality of images; determining a viewing direction of a user in both of the X and Y directions; displaying a portion of the plurality of images to the user; sensing a rate of change of the plurality of images moving in a Z direction; simultaneously coordinating the X and Y directions and the Z direction; and interlacing the viewing direction and the rate of change for automatically changing the plurality of images in the X, Y, and Z directions as the user changes the viewing direction in at least one of the X and Y directions and simultaneously moves in the Z direction.

Accordingly, the invention provides a VR system that automatically reacts to the dynamics of a user simultaneously moving in X, Y, and Z directions by altering the portion of the plurality of images displayed to the user.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
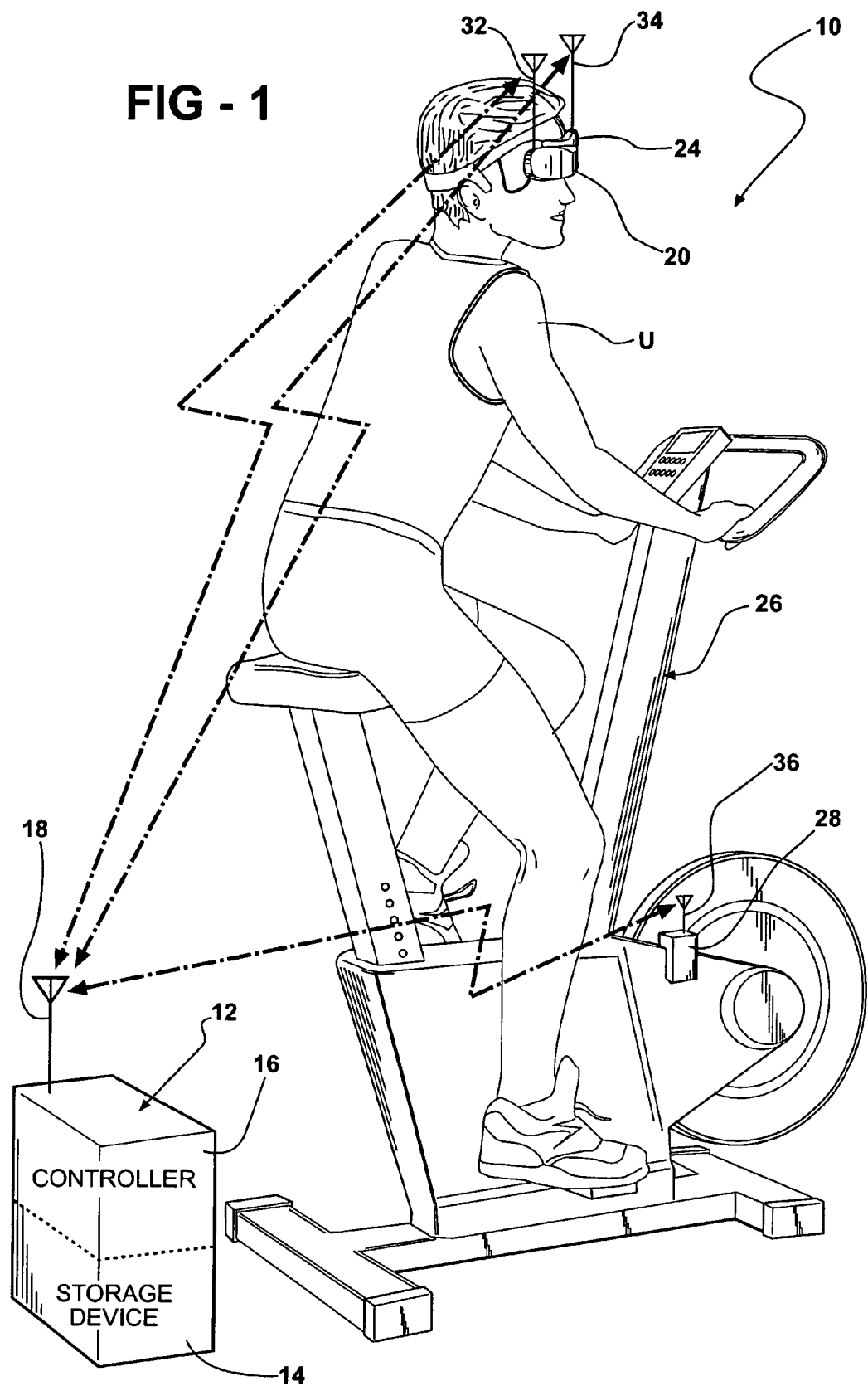
FIG. 1 is a perspective view of a preferred embodiment of a virtual reality system in accordance with the subject invention.

Referring to the Figures, wherein like numerals indicate like parts throughout the several views, a virtual reality (VR) system is shown at 10 in FIG. 1. The VR system broadly includes an image playback system 12, an image viewing device 20, and a forward and rearward moving device 26 that each communicate with each other.

The image playback system 12 includes a storage device 14 and a controller 16 operatively connected to one another. The storage device 14 maintains a plurality of images. Each image has a field-of-view defining an X direction and a Y direction. In a preferred embodiment, the X direction field-of-view is defined as 360 degrees and the Y direction field-of-view is defined as 180 degrees. However, those skilled in the art appreciate the field-of-view of the X direction may be less than 360 degrees and the field-of-view of the Y direction could be less than 180 degrees. The 360 degrees of the X direction and the 180 degrees of the Y direction represent a completely spherical image.

The images are preferably generated using a camera with a 360-degree field-of-view lens. One suitable lens is the "ParaMax360" produced by Panosmart of Antibes, France.

In a first alternative, the images may be produced by several standard lenses then combined to create the 360 degree field-of-view. A second alternative is for the images to be computer generated.

In the preferred embodiment, the plurality of images are compressed and then stored. This allows an increased amount of images to be stored on the storage device. The images are then decompressed before being displayed. Several acceptable compression/decompression algorithms (Codecs) are known to those skilled in the art. However, it is preferred that the XviD codec is implemented. The XviD codec is open-source software available via the Internet at www.xvid.org.

The image viewing device 20 operatively communicates with the image playback system 12. The image viewing device 20 displays a portion 22 of the plurality of images to a user U. In the preferred embodiment, the image viewing device 20 is further defined as a pair of display glasses 20 worn on the head of the user U. The portion 22 of the plurality of images displayed by the display glasses 20 is preferably 140 degrees in the X direction and 90 degrees in the Y direction. Those skilled in the art realize that display glasses 20 with alternate dimensional configurations are also possible. An example of suitable display glasses 20 is the "i-glasses SVGA Pro" model manufactured by i-O Display systems, LLC, a division of Ilixco, Inc., both of Menlo Park, Calif. However, a variety of suitable display glasses 20 exist and could be implemented in the VR system 10. Further, the image viewing device 20 could be a flat or curved screen or monitor positioned in front of and/or about the user U.

The forward and rearward moving device 26, in the preferred embodiment, is an exercise apparatus for allowing the user U to exercise. The exercise apparatus is illustrated in FIG. 1 as a stationary bicycle 26. However, a different type of exercise apparatus could be implemented, including, but not limited to, a treadmill, a stair climber, or an elliptical trainer. Those skilled in the art will also realize that other types of moving devices 26 could be utilized in the subject invention without deviating from the scope of the subject invention.

Preferably, the image playback system 12, image viewing device 20, and forward and rearward moving device 26 communicate with each other across one or more wireless interfaces. Specifically, the image playback system 12 includes a first wireless interface 18 for communicating with the image viewing device 20 and the forward and rearward moving device 26. Similarly, the image viewing device 20 includes a second wireless interface 32 for communicating with the first wireless interface 18 of the playback system 12. Further, the forward and rearward moving device 26 includes a similar wireless interface 36 for communicating with the first wireless interface 18 of the playback system 12. As discussed below, there may be other wireless interfaces for communicating among other components in the VR system 10.

In the preferred embodiment, the wireless interfaces 18, 32, 36, operate using radio waves. Preferably, the wireless interfaces 18, 32, 36, utilize Bluetooth® technology as described by the Bluetooth Special Interest Group headquartered in Overland Park, Kans. Other radio wave interfaces, such as 802.11, PCS, etc., may also be implemented. In a first alternative embodiment, the wireless interfaces 18, 32, 36, operate using frequencies in the optical band, such as the infrared standards developed by the Infrared Data Association (IrDA) of Walnut Creek, Calif. In a second alternative embodiment, the communication between the image playback system 12 and the other components of the VR system 10 is accomplished using a hardwired interface. This hardwired interface may involve transmission of electrons over a conductive wire or pulses of light over a fiber-optic cable.

In order to specifically monitor the movement of the user U in the X and Y directions, a directional sensor 24 is included. The directional sensor 24 operatively communicates with the image playback system 12. In particular, the directional sensor 24 defines a viewing direction of the user U in both of the X and Y directions. In the preferred embodiment, the directional sensor 24 is attached to the display glasses 20. This allows a portion of the plurality of images displayed by the display glasses 20 to change in the X and Y directions as the user U moves the display glasses 20 by moving his or her head. The directional sensor 24 preferably defines a third wireless interface 34 for communicating with the first wireless interface 18 of the playback system 12. An example of a suitable directional sensor 24 is the "InterTrax2" manufactured by InterSense of Burlington, Mass. As appreciated by those skilled in the art, any suitable directional sensor 24 may be used. Further, in the embodiment where the image viewing device 20 is a screen or monitor, the directional sensor 24 could be mounted directly to the head and/or different areas of the user U.

In order to monitor the movement of the user U in a Z direction, a speed sensor 28 is provided. The speed sensor 28 is operably connected to the forward and rearward moving device 26 such that the forward and rearward moving device 26 defines the Z direction. The speed sensor 28 also operatively communicates with the image playback system 12 to provide a rate of change of the plurality of images in the Z direction. Preferably, the speed sensor 28 is operably connected to a rotating wheel, pedal crank, or similar part of the stationary bicycle 26. The speed sensor 28 defines a fourth wireless interface 36 for communicating with the first wireless interface 18 of the playback system 12.

Figure 2:
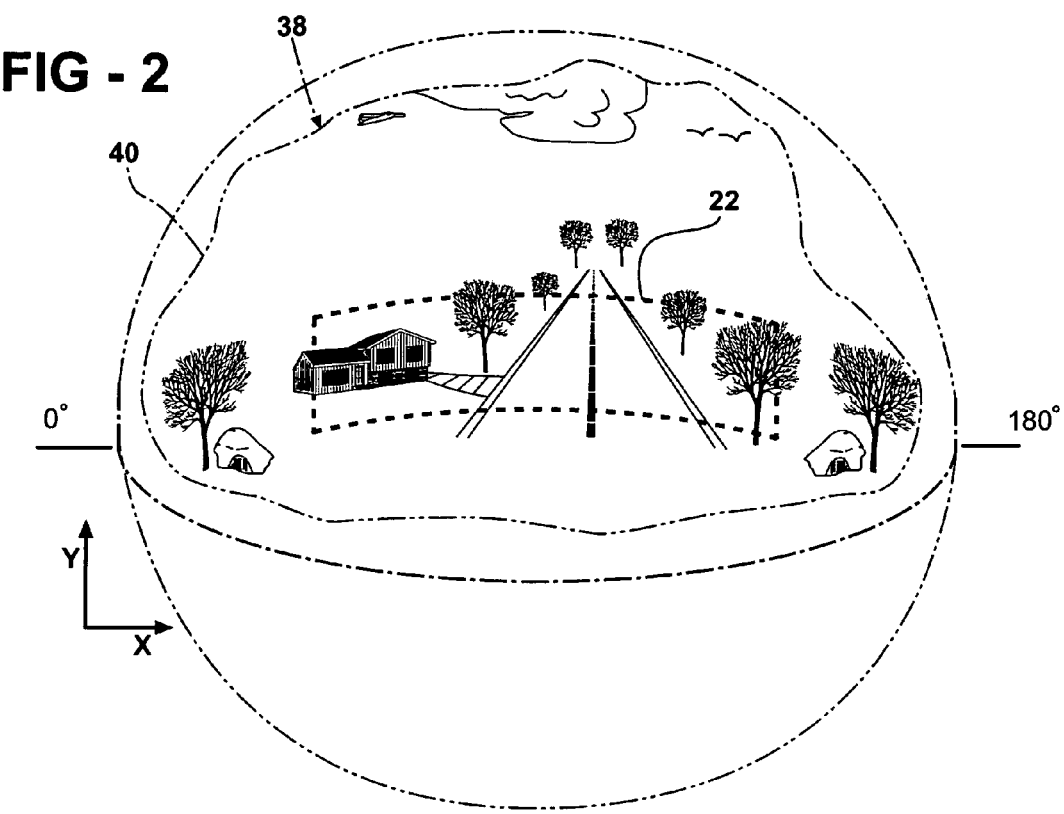
FIG. 2 is a forward-looking segment defining a first image and a portion of the first image viewed by a user.
Figure 3:
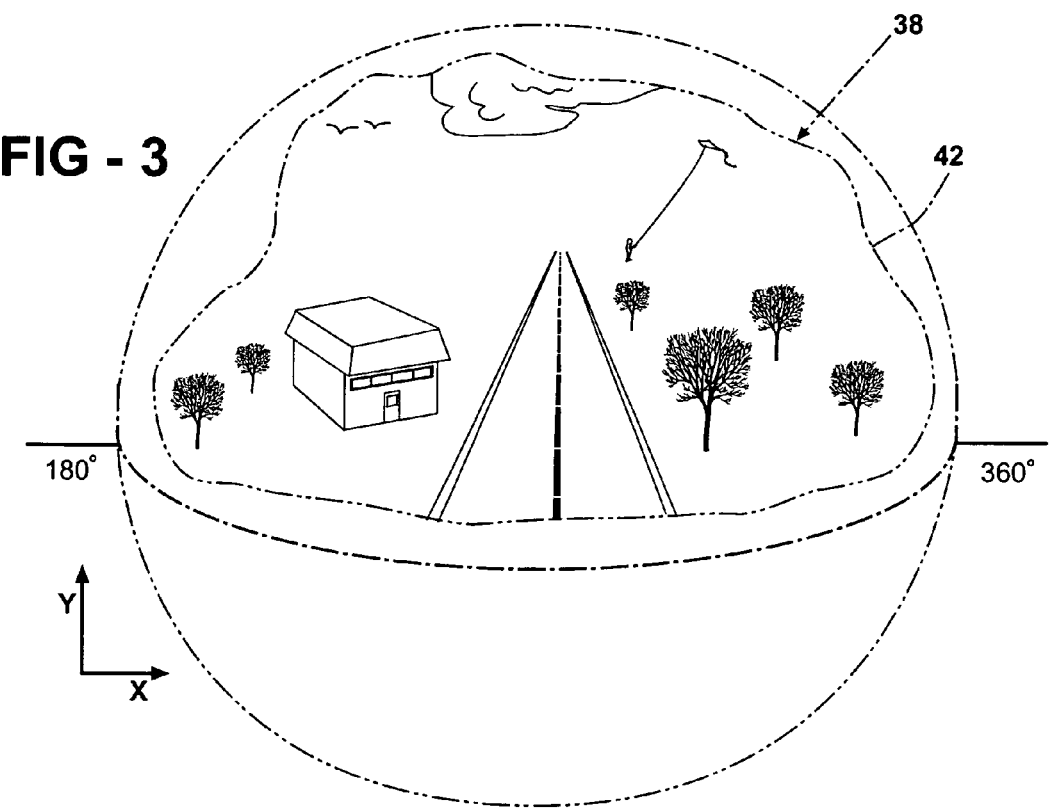
FIG. 3 is a backward-looking segment of the first image and another portion of the first image viewed by the user.
Figure 4:
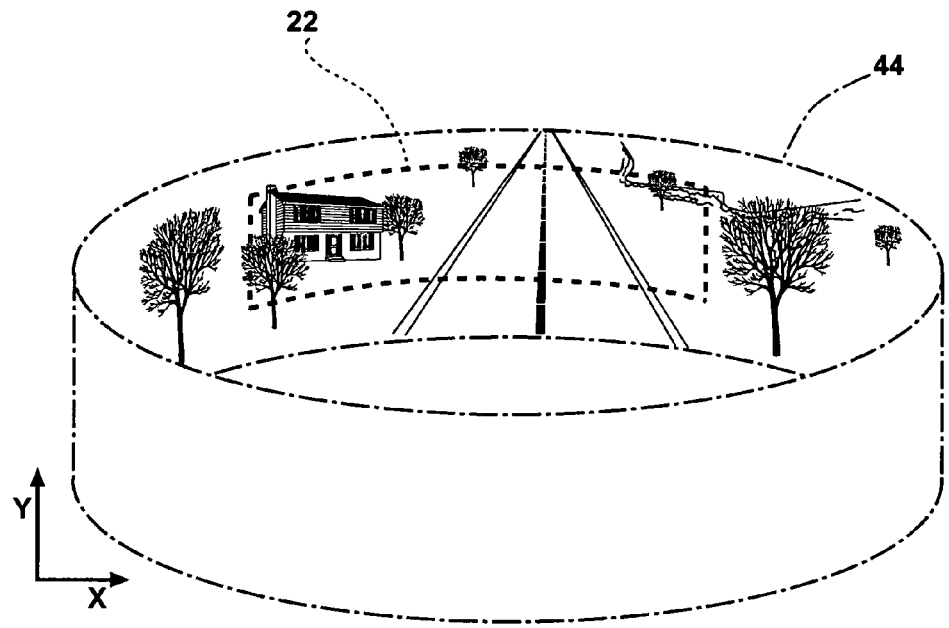
FIG. 4 is a forward-looking segment defining a second image and a portion of the second image viewed by the user.

Referring to FIGS. 2 and 3, one of the plurality of 360-degree field-of-view images is illustrated and is defined as a first image 38. A forward-looking segment 40 of the first image 38, defined by the X-direction between 0 and 180 degrees, is shown in FIG. 2. A portion 22 of the image viewed by the display glasses 20 is shown with a broken line. The portion 22 of the image is illustrated as a rectangle but could be of any suitable shape or size. FIG. 3 illustrates a backward-looking segment 42, defined by the X-direction between 180 and 360 degrees.

The controller 16 simultaneously coordinates the X and Y directions of the directional sensor 24 and the Z direction of the speed sensor 28. The viewing direction and the rate of change are interlaced to automatically change the portion 22 of the plurality of images displayed by the image viewing device 20 in the X, Y, and Z directions when the user U moves the directional sensor 24 in at least one of the X and Y directions and simultaneously moves the moving device 26 in the Z direction. In particular, the controller 16 automatically changes the portion 22 of the images displayed by the image viewing device 20 throughout the 360-degree field-of-view.

The preferred embodiment of the image playback system 12 also includes a frame buffer. The frame buffer receives the portion 22 of the plurality of images and retransmits the portion 22 at a constant frame rate. This retransmission at a constant frame rate prevents "slow motion" or blurry images from being received by the user U. The frame buffer may be implemented as software within the controller 16 or as a separate hardware module within the image playback system 22.

FIGS. 4 through 7 illustrate the coordination between the X and Y directions of the directional sensor 24 and the Z direction of the speed sensor 28. For simplification of illustration, only the forward-looking portions of the images are shown. Several of the plurality of images that would be present between FIGS. 4 and 5, between FIGS. 5 and 6, etc., are omitted to further simplify the illustration.

As the user U operates the stationary bicycle 26 of the preferred embodiment, the plurality of images are advanced in the Z direction. The first image 38, shown in FIG. 2, will advance to a second image 44, shown in FIG. 4, which will advance to a third image 46, shown in FIG. 5, to a fourth image 48, shown in FIG. 6, and finally to a fifth image 50, shown in FIG. 7. The user U, however, does not see the entirety of each of the images 38, 44, 46, 48, 50. Instead, the user U views the portion 22 of each image 38, 44, 46, 48, 50, as shown by the broken line. As the user U moves his or her head, the directional sensor 24 sends a signal to the controller 16 which, in turn, changes the portion 22 that is viewed by the user U.

Figure 5:
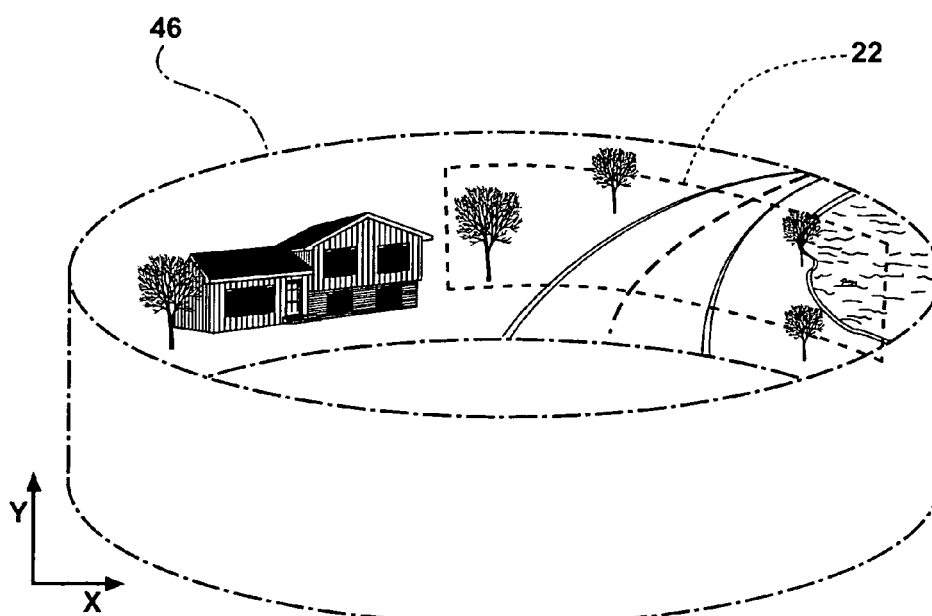
FIG. 5 is a forward-looking segment of a third image and a portion of the third image viewed by the user.
Figure 6:
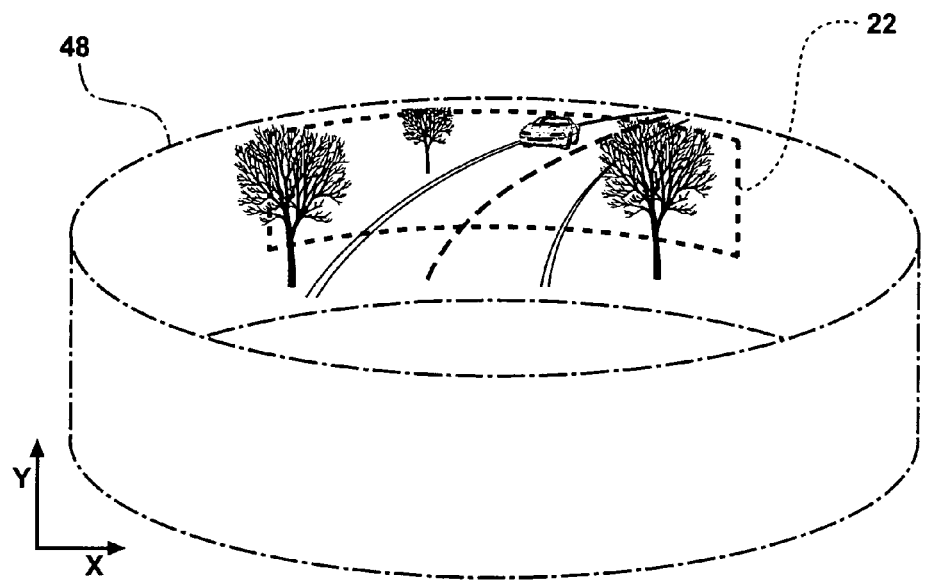
FIG. 6 is a forward-looking segment of a fourth image and a portion of the fourth image viewed by the user.
Figure 7:
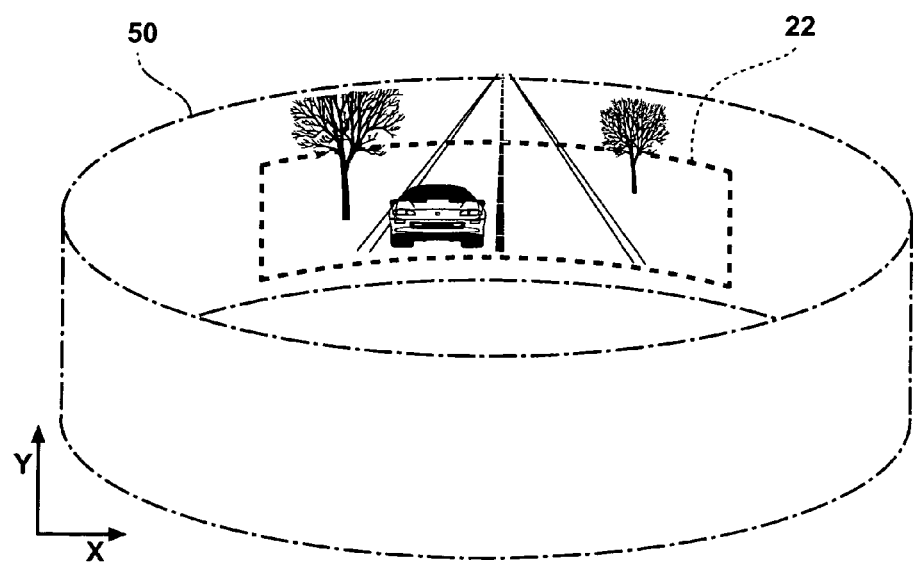
FIG. 7 is a forward-looking segment of a fifth image and a portion of the fifth image viewed by the user.

As the images are advanced, the user U can turn his or her head to the right or left, i.e. in the X direction, or up and down, i.e., in the Y direction, to view the objects in the X direction's 360-degree field-of-view. For example, the user U looking relatively straight ahead in FIG. 4 can turn his or her head to the right get a better view of the lake to the right of the road as shown in FIG. 5. Also, the user U can look up, as shown in FIG. 6, or down, as shown in FIG. 7, to focus on an approaching vehicle. If the user U stops pedaling the stationary bicycle 26, the progression of images stops. The user U may then also turn his or her head to get a better look at any objects in the stationary 360-degree field-of-view of the X direction.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the inventive novelty exercises its utility. In addition, the reference numerals in the claims are merely for convenience and are not to be read in any way as limiting.

What is claimed is:

1. A virtual reality (VR) system comprising:
   an image playback system having a storage device for maintaining a plurality of images where each image has a field-of-view defining an X direction and a Y direction;
   an image viewing device operatively communicating with said image playback system for displaying a portion of said plurality of images to a user;
   a directional sensor operatively communicating with said playback system for defining a viewing direction of the user in both of said X and Y directions;
   a forward and rearward moving device for defining a Z direction; and
   a speed sensor operably connected to said moving device and operatively communicating with said playback system for providing a rate of change of said plurality of images in said Z direction;
   said VR system characterized by said image playback system having a controller operatively connected to said storage device for simultaneously coordinating said X and Y directions of said directional sensor and said Z direction of said speed sensor such that said viewing direction and said rate of change are interlaced to automatically change said portion of said plurality of images displayed by said image viewing device in said X, Y, and Z directions when the user moves the directional sensor in at least one of the X and Y directions and simultaneously moves the moving device in the Z direction.

2. A VR system as set forth in claim 1 wherein said controller automatically changes said portion of said images displayed by said image viewing device throughout said field-of-view.

3. A VR system as set forth in claim 1 wherein said field-of-view is further defined as 360 degrees in the X direction and 180 degrees in the Y direction.

4. A VR system as set forth in claim 3 wherein said portion of said plurality of images is further defined as approximately 140 degrees in the X direction and 90 degrees Y direction.

5. A VR system as set forth in claim 1 wherein said image viewing device is further defined as display glasses adapted to be worn by the user.

6. A VR system as set forth in claim 5 wherein said directional sensor is attached to said display glasses such that said portion of said plurality of images automatically changes as said glasses move in said X and Y directions.

7. A VR system as set forth in claim 1 wherein said image playback system includes a first wireless interface for communicating with said speed sensor and said directional sensor.

8. A VR system as set forth in claim 7 wherein said speed sensor includes a second wireless interface for communicating with said first wireless interface of said playback system.

9. A VR system as set forth in claim 7 wherein said directional sensor includes a third wireless interface for communicating with said first wireless interface of said playback system.

10. A VR system as set forth in claim 1 wherein said forward and rearward moving device is further defined as an exercise apparatus for allowing a user to exercise.

11. A VR system as set forth in claim 10 wherein said speed sensor is operatively connected to said exercise apparatus and is operational as the user exercises.

12. A VR system as set forth in claim 1 wherein said plurality of images are compressed for increasing an amount of images stored on said storage device.

13. A VR system as set forth in claim 1 wherein said image playback system further includes a frame buffer operatively communicating with said image viewing device for displaying said portion of said plurality of images to the user at a constant frame rate.

14. A method of operating a virtual reality (VR) system comprising:
   maintaining a plurality of images where each image has a 360-degree field-of-view defining a X direction and a Y direction;
   determining a viewing direction of a user in both of the X and Y directions;
   displaying a portion of the plurality of images to the user; and
   sensing a rate of change of the plurality of images moving in a Z direction;

the method characterized by simultaneously coordinating the X and Y directions and the Z direction and interlacing the viewing direction and the rate of change for automatically changing the plurality of images in the X, Y, and Z directions as the user changes the viewing direction in at least one of the X and Y directions and simultaneously moves in the Z direction.

15. A method as set forth in claim 14 wherein the step of automatically changing the plurality of images is further defined as automatically changing the plurality of images in the X, Y, and Z directions throughout the 360-degree field-of-view.

16. A method as set forth in claim 14 wherein the step of maintaining the plurality of images is further defined as compressing the plurality of images and storing the plurality of images.

17. A method as set forth in claim 16 wherein the step of displaying the portion of the plurality of images is further defined as decompressing the images.

18. A method as set forth in claim 14 wherein the step of determining a viewing direction of a user is further defined as monitoring any movement of the user.

19. A method as set forth in claim 14 wherein the step of coordinating the X and Y directions and the Z direction is further defined as communicating across one or more wireless interfaces.

20. A method as set forth in claim 14 wherein the step of displaying a portion of the plurality of images to the user is further defined as displaying a portion of the plurality of images to the user at a constant frame rate.

* * * * *